United States Patent [19]
Hutten

[11] Patent Number: 5,137,238
[45] Date of Patent: Aug. 11, 1992

[54] FAST ACCESS CAMERA MOUNTING DEVICE

[76] Inventor: Friedrich W. Hutten, 21300 NE. 1st St., Redmond, Wash. 98053

[21] Appl. No.: 756,347

[22] Filed: Sep. 9, 1991

[51] Int. Cl.⁵ .............................................. B60R 11/02
[52] U.S. Cl. ................... 248/206.3; 248/187; 248/291
[58] Field of Search ............... 248/206.3, 205.5, 206.2, 248/206.4, 187, 177, 180, 291, 674, 650, 467, 206.1; 108/44, 45; 354/81, 293; 352/243

[56] References Cited

U.S. PATENT DOCUMENTS

| | | | |
|---|---|---|---|
| 2,856,146 | 10/1958 | Lehder | 248/291 |
| 3,006,052 | 10/1961 | Stickney et al. | 248/187 |
| 3,176,602 | 4/1965 | Wilt | 248/205.5 |
| 4,093,364 | 6/1978 | Miller | 352/243 X |
| 4,420,238 | 12/1983 | Felix | 352/243 X |
| 4,570,887 | 2/1986 | Banister | 248/187 |
| 4,611,734 | 9/1986 | Luecking et al. | 108/44 X |
| 4,836,482 | 6/1989 | Sokol | 248/291 X |
| 4,863,130 | 9/1989 | Marks, Jr. | 248/206.3 |
| 4,963,904 | 10/1990 | Lee | 352/243 X |

FOREIGN PATENT DOCUMENTS

| | | | |
|---|---|---|---|
| 3600643 | 7/1987 | Fed. Rep. of Germany | 248/187 |
| 247693 | 2/1926 | United Kingdom | 248/316.2 |

*Primary Examiner*—Karen J. Chotkowski
*Attorney, Agent, or Firm*—James T. English

[57] ABSTRACT

A camera mounting device particularly for automotive vehicles is easily mountable or removable from the vehicle and allows fast setup and removal of the camera from the vehicle without removing the mounting. A double suction cup attachment bracket and a leveling support member provide resistance to longitudinal, transverse, and roll forces due to the velocity, acceleration, and centrifugal forces of the vehicle.

2 Claims, 2 Drawing Sheets

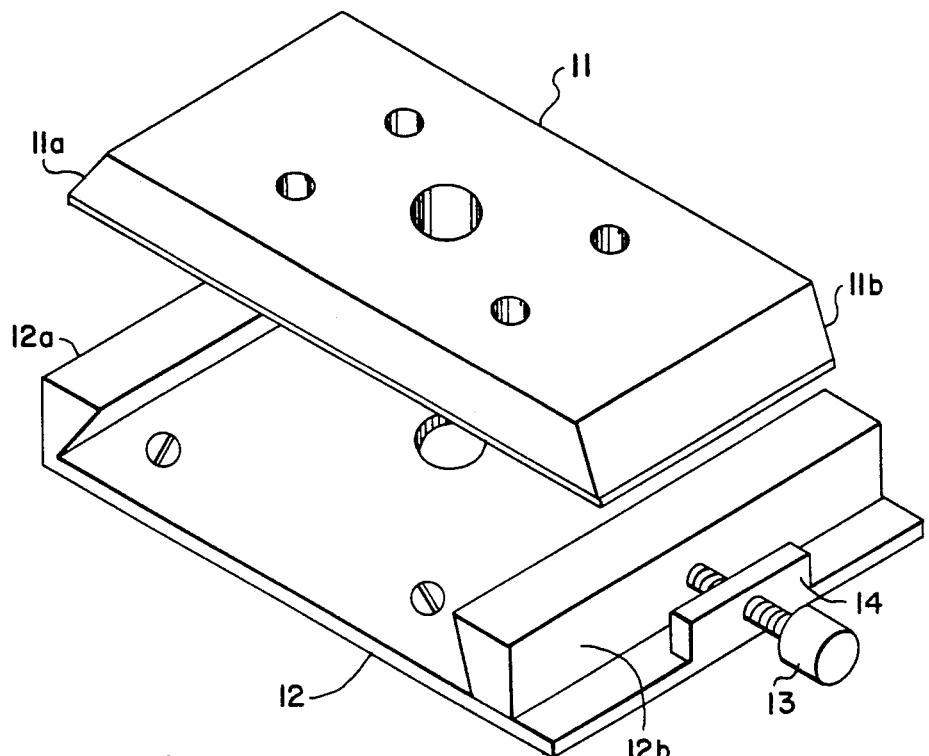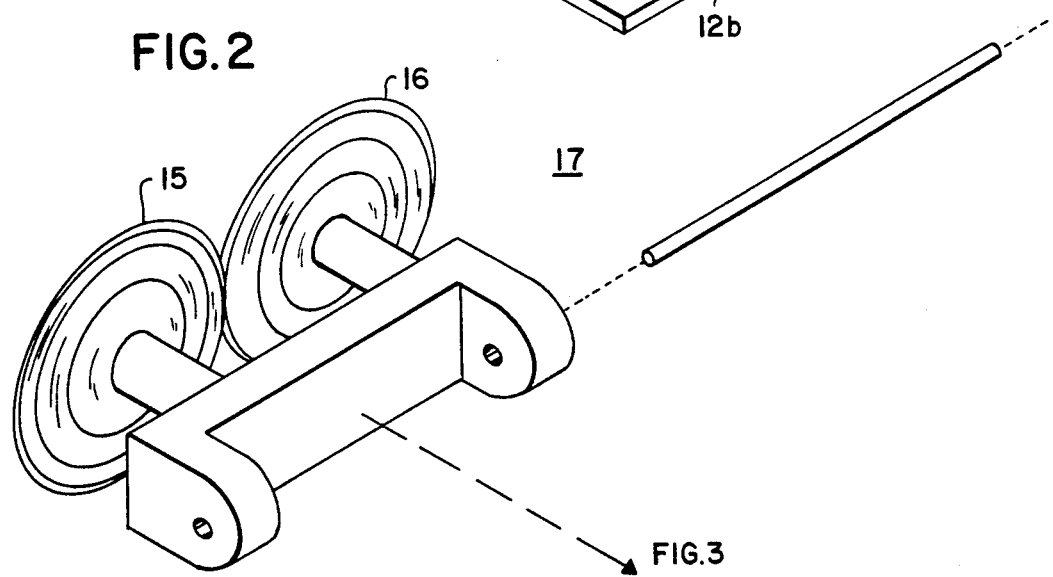

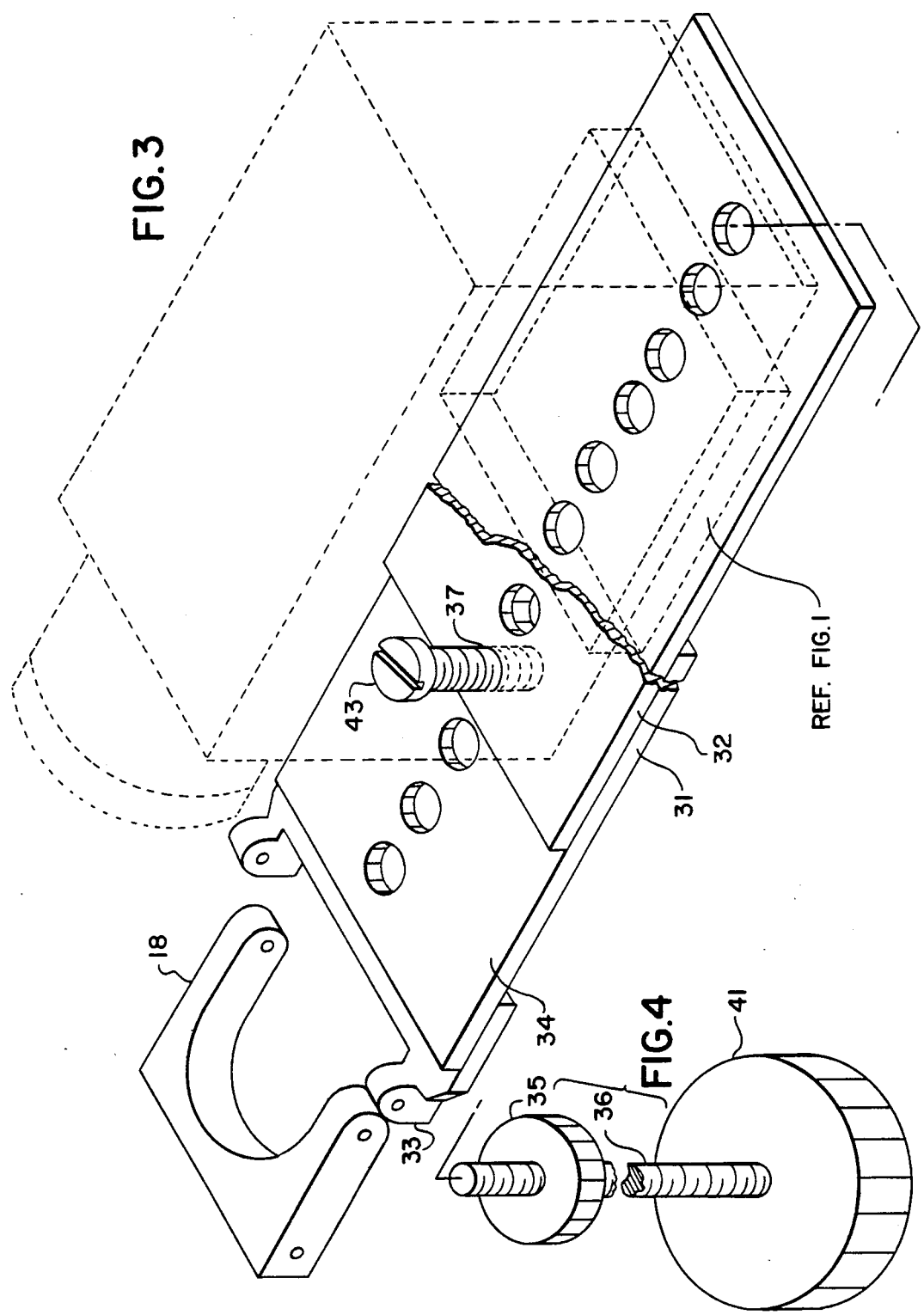

FAST ACCESS CAMERA MOUNTING DEVICE

BACKGROUND OF THE INVENTION

This invention relates to mounting methods and fixtures for cameras, particularly for mobile mounting of video cameras for fast setup and access of equipment for news gathering and the like. More particularly, it relates to universally applicable camera mounting brackets for vehicles including motor vehicles such as trucks and cars.

RELATION TO THE PRIOR ART

The prior art is based on tripod devices which are not particularly suited to vehicular use or which are dedicated devices to accomplish a particular mission as in filming scenes in a cinematic setting. These consist of brackets and rigid or gimbal mountings and require fitting to the specific vehicle. The prior art does not show an easily mountable structure for vehicles wherein the camera can be quickly and easily detached and removed and quickly replaced in the bracket as required for example, in the field of news gathering, and one that is adaptable to vehicles moving at high speeds.

BRIEF DESCRIPTION OF THE INVENTION

In accordance with the invention, a mounting plate is attached to the camera; this plate has surface and edge features whereby it is mated with a receptacle attached to an adjustable bracket mounted to the vehicle wherein the camera field of view is directed through an aperture or window of the vehicle such as on the dashboard such that the camera looks out through the windshield. In order to accommodate various camera sizes and physical characteristics, the fast access camera mounting in accordance with the invention employs an adjustable-plate base and support elements that are screw-adjustable. A double suction-cup attachment connects the base to any smooth surface such as a windshield and prevents longitudinal and rotary slippage of the base so that the camera field of view remains directed through the windshield at an accurate pointing angle. The level is screw-adjusted by a knurled nut which adjusts the distance between a support disk and the base. The support disk may rest against a feature of the vehicle such as the dashboard or may be attached thereto by adhesive or by screws. The length of the mounting base to accommodate the length of the camera is adjusted by adjusting the overlap of two plates forming the base. Spaced holes in the two plates allow adjustment of the overlap by inserting screws therethrough to fix the desired length of the base.

BRIEF DESCRIPTION OF THE FIGURES

FIG. 1 is an isometric sketch of the attachment means for coupling the camera-mounted plate to the holding clamp.

FIG. 2 is an isometric sketch of the suction-cup fixture that forms part of the of a three pivotal-piece attachment means.

FIG. 3 is an isometric sketch of the assembly which, together with FIGS. 1 and 2 illustrate the entire fast access camera mounting assembly.

FIG. 4 is an isometric sketch of the support disk and associated screw as well as the level adjustment knurled nut.

DETAILED DESCRIPTION OF THE INVENTION

Reference is now directed to FIG. 1 which shows the camera plate 11 which attaches to the camera by means of screws inserted in the custom hole pattern of the particular camera being used. It should be noted that the hole pattern is related to the type of camera, including small millimeter cameras as well as medium to large video cameras and the novel camera mounting device is adaptable to any type of camera for which an attachment plate 11 can be fabricated. The clamp 12 interfits with the attachment plate 11 by means of angled ends 12a and b, that have the same angle as the attachment plate 11 ends, 11a and 11b. A screw 13 and block 14 press the attachment plate 11 angled ends against the angled ends of the clamp 12, thereby retaining the attachment plate 11 in the clamp 12. The clamp 12 is mounted on the two-plate base 31, 32 shown in FIG. 3 and is attached thereto by screws. Very light cameras can be attached to the base by using a standard tripod type of mounting screw extending through one of the central holes in the base 34 into the camera screw receptacle.

With reference to FIG. 2, the suction cups 15, 16 are of sufficient size to allow atmospheric pressure on the cups to accommodate the longitudinal force due to the mass of the camera and mounting, considering the instantaneous forces of acceleration and velocity of the vehicle in which the novel camera mounting device is used.

Reference is now directed to FIG. 3 which shows the link 18 between the suction cups 15, 16 fixture 17, FIG. 2, and the base pivot piece 33. These three elements: suction cup fixture, link, and base pivot piece, comprise the attachment fixture that mounts on one end of the base 34, composed of overlapping plates 31, 32 and fastening screw 43. It will be appreciated that this attachment fixture will conform to any smooth surface in a plane longitudinal to the base 34, providing a holding force for the base 34 on one end. The support 41, FIG. 4, for the base also affords some resistance to forces that are longitudinal or transverse to the base 34 by virtue of its large pedestal diameter and tight fit of the screw 36 in the central bore of the base 34, but its main function is to adjust the level, and provide vertical support for the base and the camera clamped to the base. A video camera, in phantom view, is shown mounted in position on the base, showing the usual position with the field of view looking out through the windshield over the suction cups attached to the windshield. The lower plate of the base 34 rests upon the knurled nut 35 which adjusts the level of the base 34 by moving along the screw 36. The screw 36 is attached to the base 34 by inserting the screw into one of the series of spaced holes; e.g., 37 in the base 34.

Thus has been described a Fast Access Camera Mounting Device embodiment of the invention and it is recognized that other embodiments, alterations, modifications, and modes of operation may occur to those skilled in the art without departing from the teachings of the invention; it is therefore intended that the claims be interpreted as having these equivalences incorporated therein.

What is claimed is:

1. A camera mounting device for holding a camera in position for instantaneous use, which comprises:

a base consisting of first and second overlapping plates along a longitudinal axis, having spaced holes therethrough for adjusting the amount of overlap of the plates and the length of the base having ends, and having fastening means extending through at least one hole in the first and second overlapping plates of said base;

suction cup attachment means attached to said base at one end of the base and adapted to attach the base to a smooth impervious surface by means of atmospheric pressure;

a leveling means attached to said base through one of the holes in at least one of the plates near the end opposite said suction cup attachment means, for supporting and leveling said base in a quasi-horizontal attitude;

attachment means for mounting a camera on said base located on said base between said suction cup attachment means and said leveling means, said attachment means including;

a flat plate having a hole pattern for attachment to a camera by recessed flat head screws the flat plate having angled edges with the larger dimension at the bottom of the plate; and a clamp consisting of a base having a top and a bottom surface, and ends, and having a first block extending from the top surface at one end, the block having an angled inside side;

a fixed second block on the base opposite the angled side and having a threaded bore therethrough for receiving a screw;

a movable third block between the first and second blocks having an angled side facing the angled side of the first block;

screw means connecting said movable third block and said fixed second block forcing said third block toward said first block;

whereby the base, supported on the leveling means and fixed to a smooth surface transverse to the plane of the base by the suction cup attachment means, by atmospheric pressure, allows a camera attached to the base to point in a direction related to the longitudinal axis of the base and the level from horizontal.

2. A camera mounting device for holding a camera in position for instantaneous use, which comprises:

a base consisting of first and second overlapping plates along a longitudinal axis, having spaced holes therethrough for adjusting the amount of overlap of the plates and the length of the base having ends, and having fastening means extending through at least one hole in the first and second overlapping plates of said base;

suction cup attachment means attached to said base at one end of the base and adapted to attach the base to a smooth impervious surface by means of atmospheric pressure;

a leveling means attached to said base through one of the holes in at least one of the plates near the end opposite said suction cup attachment means, for supporting and leveling said base in a quasi-horizontal attitude; said leveling means including a support for the base having a large diameter pedestal and having a screw extending therefrom in tight fitting engagement with a central bore of the base, and having an adjustment nut on the screw to adjust the level of the base, and providing vertical support for the base and the camera clamped to the base;

attachment means for mounting a camera on said base located on said base between said suction cup attachment means and said leveling means, said attachment means including;

a flat plate having a hole pattern for attachment to a camera by recessed flat head screws the flat plate having angled edges with the larger dimension at the bottom of the plate; and a clamp consisting of a base having a top and a bottom surface, and ends, and having a first block extending from the top surface at one end, the block having an angled inside side;

a fixed second block on the base opposite the angled side and having a threaded bore therethrough for receiving a screw;

a movable third block between the first and second blocks having an angled side facing the angled side of the first block;

screw means connecting said movable third block and said fixed second block forcing said third block toward said first block;

whereby the base, supported on the leveling means and fixed to a smooth surface transverse to the plane of the base by the suction cup attachment means, by atmospheric pressure, allows a camera attached to the base to point in a direction related to the longitudinal axis of the base and the level from horizontal.

* * * * *